(12) United States Patent
Da et al.

(10) Patent No.: US 11,353,542 B2
(45) Date of Patent: Jun. 7, 2022

(54) POSITIONING METHOD AND POSITIONING DEVICE

(71) Applicant: CHINA ACADEMY OF TELECOMMUNICATIONS TECHNOLOGY, Beijing (CN)

(72) Inventors: Ren Da, Beijing (CN); Hui Li, Beijing (CN); Haiyang Quan, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/962,173

(22) PCT Filed: Jan. 3, 2019

(86) PCT No.: PCT/CN2019/070180
§ 371 (c)(1),
(2) Date: Jul. 14, 2020

(87) PCT Pub. No.: WO2019/141090
PCT Pub. Date: Jul. 25, 2019

(65) Prior Publication Data
US 2020/0408871 A1  Dec. 31, 2020

(30) Foreign Application Priority Data
Jan. 19, 2018 (CN) .......................... 201810053856.3

(51) Int. Cl.
*H04W 64/00* (2009.01)
*G01S 5/10* (2006.01)
(Continued)

(52) U.S. Cl.
CPC .............. *G01S 5/10* (2013.01); *H04L 5/0048* (2013.01); *H04W 24/10* (2013.01); *H04W 64/00* (2013.01)

(58) Field of Classification Search
CPC ..... H04W 64/00; H04W 64/003; G01S 19/45; G01S 19/46; G01S 5/10
See application file for complete search history.

(56) References Cited

U.S. PATENT DOCUMENTS 10,736,113 B2 * 8/2020 Wang ...................... H04L 5/005
2013/0113660 A1   5/2013 Tufvesson et al.
(Continued)

FOREIGN PATENT DOCUMENTS

WO   WO-2018149481 A1 * 8/2018 .......... H04W 52/367

OTHER PUBLICATIONS

Second Office Action for Japanese Patent Application 2020-539823 dated Apr. 12, 2022 and it's English Translation provided by global dossier.
(Continued)

*Primary Examiner* — Kevin Kim
(74) *Attorney, Agent, or Firm* — Ladas & Parry, LLP

(57) ABSTRACT

A positioning method and related devices are provided. The method includes: measuring, by a UE, PRSs sent by a plurality of positioning reference devices to obtain a plurality of PRS measurement results; measuring, by the UE, SPRSs sent by the plurality of positioning reference devices to obtain a plurality of SPRS measurement results; performing, by the UE, a positioning operation based on the plurality of PRS measurement results and the plurality of SPRS measurement results, wherein the positioning operation includes: sending the plurality of PRS measurement results and the plurality of SPRS measurement results to a positioning server, so that the positioning server determines a
(Continued)

position of the UE based on the plurality of PRS measurement results and the plurality of SPRS measurement results; or determining, by the UE, the position of the UE based on the plurality of PRS measurement results and the plurality of SPRS measurement results.

17 Claims, 9 Drawing Sheets

(51) Int. Cl.
      *H04L 5/00*        (2006.01)
      *H04W 24/10*     (2009.01)

(56) References Cited

U.S. PATENT DOCUMENTS

| | | |
|---|---|---|
| 2015/0198719 A1 | 7/2015 | Mulherin |
| 2018/0017661 A1 | 1/2018 | Morioka |
| 2020/0204317 A1* | 6/2020 | Kim .................. H04L 27/2613 |

OTHER PUBLICATIONS

3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14), 3GPP TS 36.305 V14.3.0, Sep. 2017, all pages.

Examination Report from IN app. No. 202047033145, dated Nov. 12, 2021, all pages.

* cited by examiner

POSITIONING METHOD AND POSITIONING DEVICE

CROSS-REFERENCE TO RELATED APPLICATIONS

The present application is the U.S. national phase of PCT Application No. PCT/CN2019/070180 filed on Jan. 3, 2019, which claims a priority to the Chinese patent application No. 201810053856.3 filed on Jan. 19, 2018, the disclosures of which are incorporated herein by reference in their entireties.

TECHNICAL FIELD

The present disclosure relates to the field of communication technology, in particular to a positioning method and a positioning device.

BACKGROUND

A variety of user equipment (UE) positioning methods are defined in the communication system in the related art, for example: an observed time difference of arrival (OTDOA) method, an enhanced cell identification (E-CID) positioning method and an uplink observed time difference of arrival (UTDOA) method. These methods mainly determine the position of the UE by measuring a reference signal of a wireless communication network itself, rather than based on an external reference signal of the wireless communication network. However, the positioning methods defined in the communication systems in the related art all have the problem of low positioning accuracy.

SUMMARY

An embodiment of the present disclosure provides a positioning method, including: measuring, by a user equipment (UE), positioning reference signals (PRSs) sent by a plurality of positioning reference devices to obtain a plurality of PRS measurement results; measuring, by the UE, sinusoidal positioning reference signals (SPRSs) sent by the plurality of positioning reference devices to obtain a plurality of SPRS measurement results; performing, by the UE, a positioning operation based on the plurality of PRS measurement results and the plurality of SPRS measurement results, wherein the positioning operation comprises: sending the plurality of PRS measurement results and the plurality of SPRS measurement results to a positioning server, so that the positioning server determines a position of the UE based on the plurality of PRS measurement results and the plurality of SPRS measurement results; or the positioning operation comprises: determining, by the UE, the position of the UE based on the plurality of PRS measurement results and the plurality of SPRS measurement results.

Optionally, the measuring, by the UE, sinusoidal positioning reference signals (SPRSs) sent by the plurality of positioning reference devices to obtain a plurality of SPRS measurement results includes: measuring the SPRSs sent by the plurality of positioning reference devices on a plurality of different frequency resources to obtain the plurality of SPRS measurement results, wherein different positioning reference devices use different frequency resources to send the SPRSs.

Optionally, the positioning method further includes: obtaining by the UE, SPRS configuration information of the plurality of positioning reference devices, and the SPRS configuration information of each positioning reference device includes frequency configuration information and time configuration information on which the positioning reference device sends the SPRS; the measuring the SPRSs sent by the plurality of positioning reference devices on a plurality of different frequency resources to obtain the plurality of SPRS measurement results includes: measuring, by the UE, the SPRSs sent by the plurality of positioning reference devices based on the SPRS configuration information of the plurality of positioning reference devices, to obtain the plurality of SPRS measurement results.

Optionally, each positioning reference device configures a fixed frequency resource to send the SPRS, or each positioning reference device configures a different frequency to send the SPRS at a different time.

Optionally, the positioning method further includes at least one of: exchanging, by the UE, the plurality of PRS measurement results and the plurality of SPRS measurement results with other UEs; exchanging, by the UE, respective position information with other UEs; sending, by the UE, PRS and SPRS to other UEs; and exchanging, by the UE, respective PRS configuration information and SPRS configuration information with other UEs.

Optionally, the measuring the SPRSs sent by the plurality of positioning reference devices to obtain the plurality of SPRS measurement results includes: measuring, by the UE, the SPRSs continuously sent by the plurality of positioning reference devices to obtain the plurality of SPRS measurement results; or measuring, by the UE, the SPRSs periodically sent by the plurality of positioning reference devices to obtain the plurality of SPRS measurement results; or measuring, by the UE, the SPRSs sent by the plurality of positioning reference devices as needed to obtain the plurality of SPRS measurement results.

Optionally, at least one of reference signal time difference (RSTD) and reference signal received power (RSRP); each SPRS measurement result comprises an SPRS carrier phase (SPRS-CP) measurement value.

Optionally, the sending the plurality of PRS measurement results and the plurality of SPRS measurement results to a positioning server includes: sending a report message to the positioning server, wherein the report message includes the plurality of PRS measurement results and information elements for reporting the plurality of SPRS measurement results, the information elements include the SPRS measurement result of each SPRS.

Optionally, the information elements further comprise: at least one of a cell identifier corresponding to each SPRS, an SPRS index, a reference time during measurement, and a quality indication of a carrier measurement value.

Optionally, the plurality of positioning reference devices comprise a plurality of network side devices; or the plurality of positioning reference devices comprise at least one network side device and at least one other UE; or the plurality of positioning reference devices comprise a plurality of other UEs.

An embodiment of the present disclosure further provides a positioning method, including: sending, by a positioning reference device, a PRS to a UE, so that the UE measures the PRS to obtain a PRS measurement result; sending, by the positioning reference device, a SPRS to the UE, so that the UE measures the SPRS to obtain an SPRS measurement result, wherein the PRS measurement result and the SPRS measurement result are used for positioning of the UE.

Optionally, different positioning reference devices send SPRSs to UEs through different frequency resources.

Optionally, the positioning method further includes: sending, by the positioning reference device, SPRS configuration information to the UE, and the SPRS configuration information includes frequency configuration information and time configuration information on which the positioning reference device sends SPRS.

Optionally, each positioning reference device sends the SPRS on a fixed frequency resource, or each positioning reference device sends the SPRS on a different frequency at a different time.

Optionally, the sending, by the positioning reference device, the SPRS to the UE includes: the positioning reference device continuously sending SPRS to the UE; or the positioning reference device periodically sending SPRS to the UE; or the positioning reference device sending the SPRS to the UE as needed.

Optionally, the positioning reference device is a network side device or another UE.

An embodiment of the present disclosure further provides a positioning method, including: receiving, by a positioning server, a plurality of PRS measurement results and a plurality of SPRS measurement results sent by a UE; determining, by the positioning server, a position of the UE based on the plurality of PRS measurement results and the plurality of SPRS measurement results.

Optionally, each PRS measurement result includes: at least one of RSTD and RSRP, each SPRS measurement result comprises an SPRS-CP measurement value.

Optionally, the receiving, by the positioning server, a plurality of PRS measurement results and a plurality of SPRS measurement results sent by the UE includes: receiving, by the positioning server, a report message sent by the UE, wherein the report message includes the plurality of PRS measurement results and information elements for reporting the plurality of SPRS measurement results, the information elements include the SPRS measurement result for each SPRS.

Optionally, the information elements further include: at least one of a cell identifier corresponding to each SPRS, an SPRS index, a reference time during measurement, and a quality indication of a carrier measurement value.

An embodiment of the present disclosure further provides a user equipment (UE), including: a first measurement module, configured to measure PRSs sent by a plurality of positioning reference devices to obtain a plurality of PRS measurement results; a second measurement module, configured to measure SPRSs sent by the plurality of positioning reference devices to obtain a plurality of SPRS measurement results; and a positioning module, configured to perform a positioning operation based on the plurality of PRS measurement results and the plurality of SPRS measurement results, wherein the positioning operation includes: sending the plurality of PRS measurement results and the plurality of SPRS measurement results to a positioning server, so that the positioning server determines the position of the UE based on the plurality of PRS measurement results and the plurality of SPRS measurement results; or the positioning operation includes: determining, by the UE, the position of the UE based on the plurality of PRS measurement results and the plurality of SPRS measurement results.

Optionally, each PRS measurement result includes: at least one of RSTD and RSRP, each SPRS measurement result includes an SPRS-CP measurement value.

An embodiment of the present disclosure further provides a positioning reference device, including: a first sending module, configured to send a PRS to a UE, so that the UE measures the PRS to obtain a PRS measurement result; a second sending module, configured to send an SPRS to the UE, so that the UE measures the SPRS to obtain an SPRS measurement result, wherein the PRS measurement result and the SPRS measurement result are used for positioning of the UE.

An embodiment of the present disclosure further provides a positioning sever, including: a receiving module, configured to receive a plurality of PRS measurement results and a plurality of SPRS measurement results sent by a UE; and a positioning module, configured to determine a position of the UE based on the plurality of PRS measurement results and the plurality of SPRS measurement results.

Optionally, each PRS measurement result includes: at least one of RSTD and RSRP, each SPRS measurement result comprises an SPRS-CP measurement value.

An embodiment of the present disclosure further provides a user equipment (UE), including a transceiver, a memory, a processor, and a computer program stored in the memory and executed by the processor, wherein the transceiver is configured to measure PRSs sent by a plurality of positioning reference devices to obtain a plurality of PRS measurement results; measure SPRSs sent by the plurality of positioning reference devices to obtain a plurality of SPRS Measurement results; perform a positioning operation based on the plurality of PRS measurement results and the plurality of SPRS measurement results, the positioning operation includes: sending the plurality of PRS measurement results and the plurality of SPRS measurement results to a positioning server, so that the positioning server determines the position of the UE based on the plurality of PRS measurement results and the plurality of SPRS measurement results; or the positioning operation includes determining, by the UE, the position of the UE based on the plurality of PRS measurement results and the plurality of SPRS measurement results; or the transceiver is configured to measure the PRSs sent by the plurality of positioning reference devices to obtain the plurality of PRS measurement results; measure the SPRSs sent by the plurality of positioning reference devices to obtain the plurality of SPRS measurement results.

Optionally, the measuring SPRSs sent by the plurality of positioning reference devices to obtain a plurality of SPRS measurement results includes: measuring SPRSs sent by the plurality of positioning reference devices on a plurality of different frequency resources to obtain the plurality of SPRS measurement results, wherein different positioning reference devices use the plurality of different frequency resources to send the SPRSs.

Optionally, the transceiver or the processor is further configured to: obtain SPRS configuration information of the plurality of positioning reference devices, and the SPRS configuration information of each positioning reference device includes frequency configuration information and time configuration information on which the positioning reference device sends the SPRS; the measuring SPRSs sent by the plurality of positioning reference devices on a plurality of different frequency resources to obtain a plurality of SPRS measurement results includes: measuring the SPRSs sent by the plurality of positioning reference devices based on the SPRS configuration information of the plurality of positioning reference devices, to obtain the plurality of SPRS measurement results.

Optionally, each positioning reference device configures a fixed frequency resource to send the SPRS, or each positioning reference device configures a different frequency to send the SPRS at a different time.

Optionally, the transceiver is further configured to perform at least one of: exchanging the plurality of PRS measurement results and the plurality of SPRS measurement results with other UEs; exchanging respective position information with other UEs; sending PRS and SPRS to other UEs; and exchanging respective PRS configuration information and SPRS configuration information with other UEs.

Optionally, the measuring SPRSs sent by the plurality of positioning reference devices to obtain a plurality of SPRS measurement results includes: measuring SPRSs continuously sent by the plurality of positioning reference devices to obtain the plurality of SPRS measurement results; or measuring SPRSs periodically sent by the plurality of positioning reference devices to obtain the plurality of SPRS measurement results; or measuring SPRSs sent by the plurality of positioning reference devices as needed to obtain the plurality of SPRS measurement results.

Optionally, each PRS measurement result includes: at least one of RSTD and RSRP, each SPRS measurement result includes an SPRS-CP measurement value.

Optionally, the sending the plurality of PRS measurement results and the plurality of SPRS measurement results to the positioning server includes: sending a report message to the positioning server, wherein the report message includes the plurality of PRS measurement results and information elements for reporting SPRS measurement results, the information elements include the SPRS measurement result of each SPRS.

Optionally, the information elements further includes: at least one of a cell identifier corresponding to each SPRS, an SPRS index, a reference time during measurement, and a quality indication of a carrier measurement value.

Optionally, the plurality of positioning reference devices include a plurality of network side devices; or the plurality of positioning reference devices include at least one network side device and at least one other UE; or the plurality of positioning reference devices include a plurality of other UEs.

An embodiment of the present disclosure further provides a positioning reference device, including a transceiver, a memory, a processor, and a computer program stored in the memory and executed by the processor, wherein the transceiver is configured to send a PRS to a UE, so that the UE measures the PRS to obtain a PRS measurement result; send an SPRS to the UE, so that the UE measures the SPRS to obtain an SPRS measurement result, the PRS measurement result and the SPRS measurement result are used for positioning of the UE.

Optionally, different positioning reference devices send SPRSs to the UE through different frequency resources.

Optionally, the transceiver is further configured to: send SPRS configuration information to the UE, wherein the SPRS configuration information includes frequency configuration information and time configuration information on which the positioning reference device sends the SPRS.

Optionally, each positioning reference device sends the SPRS on a fixed frequency resource, or each positioning reference device sends the SPRS on a different frequency at a different time.

Optionally, the sending the SPRS to the UE includes: continuously sending the SPRS to the UE; or periodically sending the SPRS to the UE; or sending the SPRS to the UE as needed.

Optionally, the positioning reference device is a network side device or another UE.

An embodiment of the present disclosure further provides a positioning server, including a transceiver, a memory, a processor, and a computer program stored in the memory and executed by the processor, wherein the transceiver is configured to receive a plurality of PRS measurement results and a plurality of SPRS measurement results sent by a UE; determine a position of the UE based on the plurality of PRS measurement results and the plurality of SPRS measurement results; or the transceiver is configured to receive the plurality of PRS measurement results and the plurality of SPRS measurement results sent by the UE; the processor is configured to read the program in the memory and perform the following process: determining the position of the UE based on the plurality of PRS measurement results and the plurality of SPRS measurement results.

Optionally, each PRS measurement result includes: at least one of RSTD and RSRP, each SPRS measurement result includes an SPRS-CP measurement value.

Optionally, the receiving the plurality of PRS measurement results and the plurality of SPRS measurement results sent by the UE includes: receiving a report message sent by the UE, the report message including the plurality of PRS measurement results and information elements for reporting the plurality of SPRS measurement results, wherein the information elements include the SPRS measurement result of each SPRS.

Optionally, the information elements further include: at least one of a cell identifier corresponding to each SPRS, an SPRS index, a reference time during measurement, and a quality indication of a carrier measurement value.

An embodiment of the present disclosure further provides a computer-readable storage medium having a computer program stored thereon, when executed by a processor, implementing the step of the positioning method at a UE side; or the steps of the positioning method at a positioning reference device side; or the steps of the positioning method at a positioning server side.

DETAILED DESCRIPTION

Figure 1:
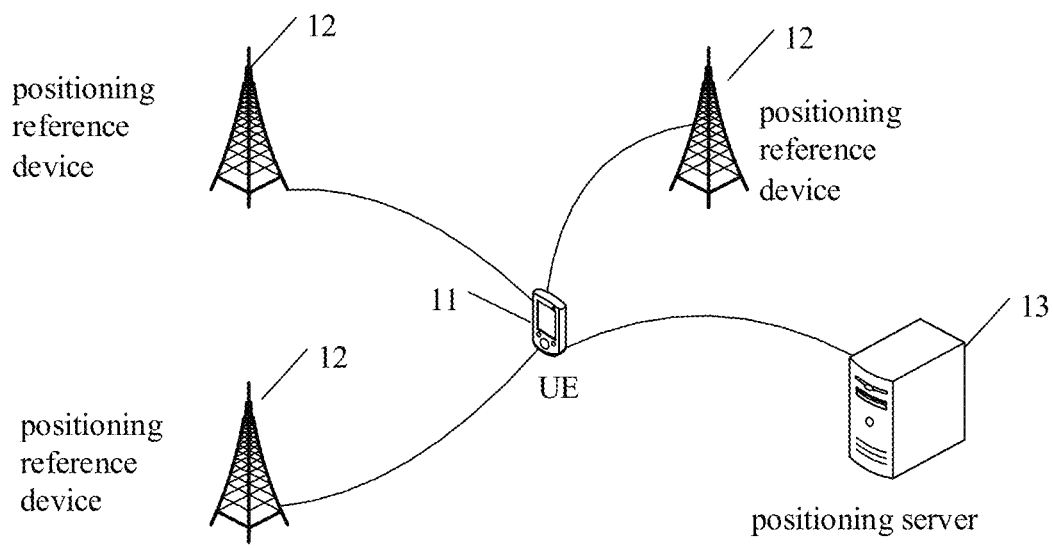
FIG. 1 is a schematic diagram of a network structure applicable to an embodiment of the present disclosure.

FIG. 1 is a schematic diagram of a network structure applicable to an embodiment of the present disclosure. As shown in FIG. 1, the network structure includes a User Equipment (UE) 11, a plurality of positioning reference devices 12, and a positioning server 13. The UE 11 may be a mobile phone, a vehicle user terminal, a tablet personal computer, a laptop computer, a personal digital assistant (PDA), a mobile Internet device (MID) or a wearable device. It should be noted that the specific type of the UE 11 is not limited in the embodiments of the present disclosure. The positioning reference device 12 may be a network side device, such as a base station, which may be a macro station, LTE eNB, 5G NR NB, etc. The network side device may also be a small station, such as a low power node (LPN), a pico and femto, or network side devices may be an access point (AP). The base station can also be a network node constituted by a central unit (CU) and a plurality of transmission and reception points (TRP) managed and controlled by the CU. Alternatively, the above-mentioned positioning reference device 12 may be other UEs than the UE 11, for example, the UE 11 and other UEs are vehicle user terminal, which can be applied to a vehicle to vehicle (V2X) vehicle cooperative positioning system. In addition, in the V2X vehicle cooperative positioning system, some of the positioning reference devices 12 may be UEs other than the UE 11, and others of the positioning reference devices 12 may be network side devices. Of course, all positioning reference devices 12 may be the UEs other than the UE 11 or network side devices, which is not limited in this embodiment of the present disclosure. It should be noted that the specific type of the positioning reference device 12 is not limited in the embodiments of the present disclosure. In addition, the vehicle user terminal may be an in-vehicle communication device, or may be a UE (for example, a mobile phone) located inside the vehicle, etc., which is not limited in this embodiment of the present disclosure. The positioning server 13 may be a server device, or the positioning server may be a network side device (for example, a base station) provided with a wireless communication system. Of course, in some cases, the positioning server 13 may be a same device as a positioning reference device 12. It should be noted that the specific type of the positioning server 13 is not limited in the embodiment of the present disclosure.

Figure 2:
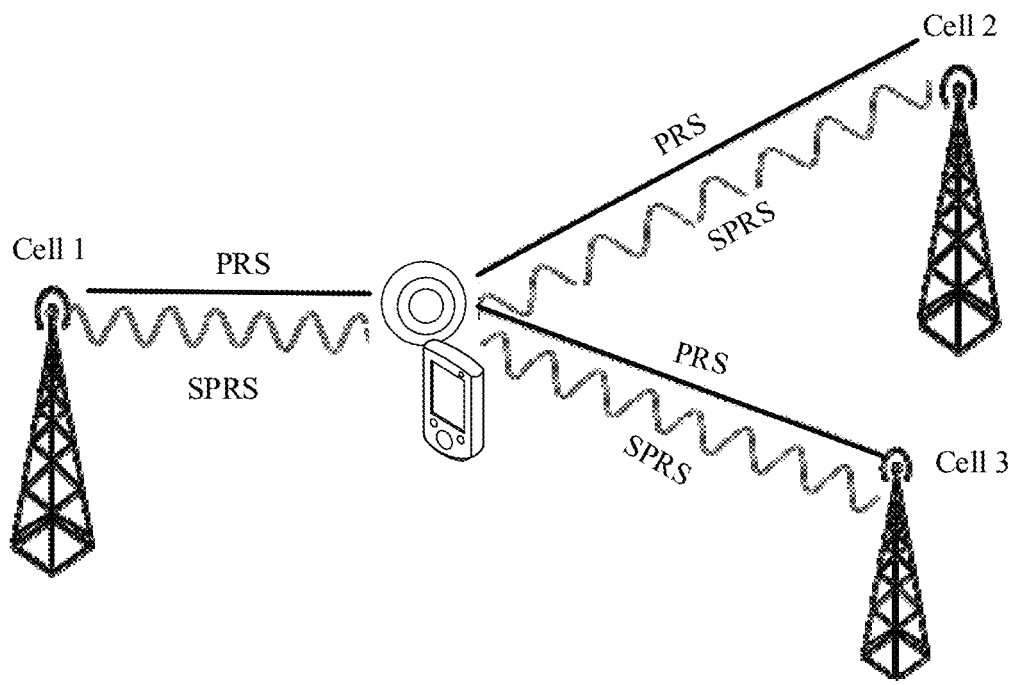
FIG. 2 is a schematic diagram of a scenario applicable to an embodiment of the present disclosure.
Figure 3:
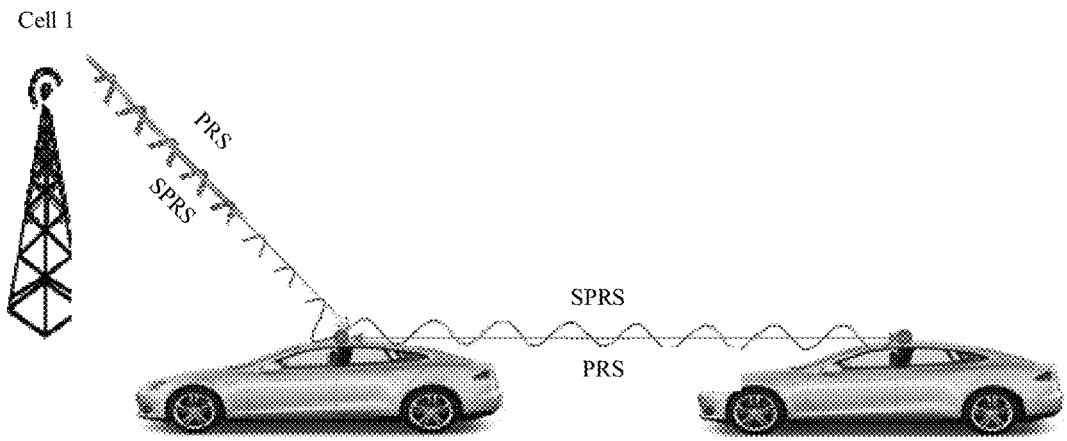
FIG. 3 is a schematic diagram of another scenario applicable to an embodiment of the present disclosure.

The embodiment of the present disclosure can be applied to the positioning of a UE in a wireless communication system. For example, as shown in FIG. 2, the UE measures a positioning reference signal (PRS) and a sinusoidal positioning reference signal (SPRS) sent by network side devices in a plurality of cells to achieve positioning. For another example, as shown in FIG. 3, the vehicle user terminal measures PRS and SPRS sent by a network side device of a cell and another UE to achieve positioning.

Figure 4:
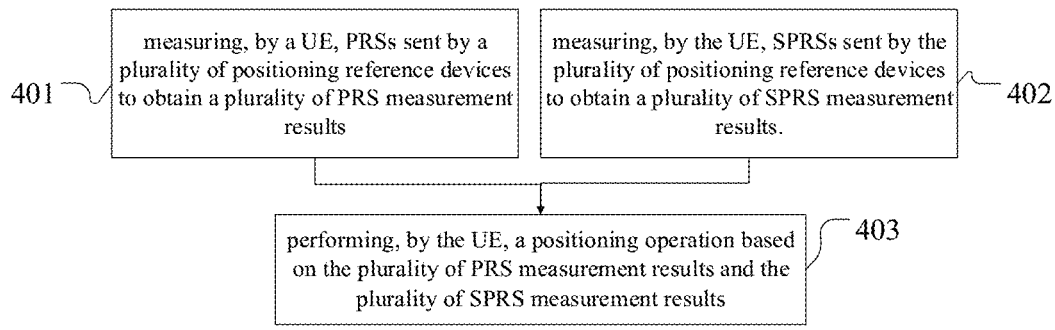
FIG. 4 is a flowchart of a positioning method provided by an embodiment of the present disclosure.

FIG. 4 is a flowchart of a positioning method provided by an embodiment of the present disclosure. As shown in FIG. 4, the method includes the following steps.

401. measuring, by a UE, PRSs sent by a plurality of positioning reference devices to obtain a plurality of PRS measurement results.

402. measuring, by the UE, SPRSs sent by the plurality of positioning reference devices to obtain a plurality of SPRS measurement results.

403. performing, by the UE, a positioning operation based on the plurality of PRS measurement results and the plurality of SPRS measurement results.

The positioning operation includes: sending the plurality of PRS measurement results and the plurality of SPRS measurement results to a positioning server, so that the positioning server determines the position of the UE based on the plurality of PRS measurement results and the plurality of SPRS measurement results. Alternatively, the positioning operation includes the UE determines the position of the UE based on the plurality of PRS measurement results and the plurality of SPRS measurement results.

The plurality of positioning reference devices may be network side devices of a plurality of cells, for example, as shown in FIG. 2, or the plurality of positioning reference devices may be a plurality of vehicle devices, or the plurality of positioning reference devices include the network side equipment and the vehicle equipment in a cell. In the embodiment of the present disclosure, the plurality of positioning reference devices may refer to two or more positioning reference devices, for example, it may be determined based on requirements, and is not limited herein.

The measuring of the PRS may be to measure time difference or reception power of each PRS.

In the embodiment of the present disclosure, the SPRS may be a sinusoidal carrier positioning reference signal used for carrier phase positioning. In addition, the SPRS is a sinusoidal carrier signal (or may also be referred to as a pure sinusoidal carrier signal), and the plurality of positioning reference devices may transmit the SPRS on different frequency resources, for example, network side devices in adjacent different cells can send SPRS in different subcarriers. In this way, the UE can measure phase information of different SPRSs.

In the embodiment of the present disclosure, the PRS and SPRS sent by the plurality of positioning reference devices are measured, the positioning of the UE can be determined based on the measurement result. In addition, since a measurement error of a carrier phase measurement value can be in the order of centimeters or less, in this way, a positing measurement method using the carrier signal phase measurement value combined with the PRS can be realized through the above steps, and the position of the UE can be determined with high accuracy.

It should be noted that in the above method, the carrier reference signal is sent through the 3GPP wireless communication network itself, and the positioning is performed based on the PRS measurement results and the SPRS measurement results. Because in this method, the carrier reference signal is sent through the 3GPP wireless communication network itself, when the satellite signal of a Global Navigation Satellite System (GNSS) is weak or unavailable, the positioning still can be achieved by using the SPRS measurement results (carrier signal phase measurement values) and the PRS measurement results, so that the position of the UE can be determined with high accuracy. The positioning using the PRS measurement results is a well-known positioning method in the art. In the embodiment of the present disclosure, the positioning method using the SPRS measurement results combined with the PRS measurement results, thereby further improving the accuracy of positioning the UE.

It should be noted that, in the embodiments of the present disclosure, the implementation for determining the position of the UE based on the plurality of PRS measurement results and the plurality of SPRS measurement results is not limited, because when the UE obtains the plurality of PRS measurement results and the plurality of SPRS measurement results sent by the plurality of positioning references devices, a person skilled in the art can obtain the position of the UE through various mathematical solutions, for example: positioning algorithms in various related technologies (LTE positioning protocol (LPP) or LPPa) to determine the position of the UE. Optionally, the UE or the positioning server can also position the UE based on the PRS and SPRS measurement results and position information of transmitting antennas of a plurality of positioning reference devices to acquire more accurate position information.

Optionally, the measurement of the SPRS may be a carrier phase measurement value obtained by measuring the phase difference between a received carrier reference signal and a carrier signal generated inside a receiver.

In addition, since the SPRS is a simple sinusoidal signal in the time domain, the carrier phase measurement can be obtained using the technique of carrier phase tracking in many related arts. For example, the UE can measure the carrier phase through a carrier phase lock loop (PLL). Moreover, PLLs have been widely used in communication and navigation receivers. In this way, measurement using the PLL will not increase the measurement cost of the UE.

In addition, the basic principle of PLL is realized by generating a replica of the measured signal inside the receiver and synchronizing the phase of the replica with the phase of the measured signal. The PLL can be composed of three basic components: a phase detector, for providing output measurement results, which is proportional to the carrier error to be compensated; a loop filter, which is a narrow-band low-pass filter, and can be used to smooth the change caused by the noise output from the phase detector; and a Numerical Controlled Oscillator (NCO) or a Voltage Controlled Oscillator (VCO) used to generate a local replica carrier based on the correction applied by the loop filter output. Of course, in the embodiment of the present disclosure, in order to ensure the performance of the carrier phase measurement, a more advanced PLL structure may also be used to provide a more robust carrier phase measurement, which is not limited in this embodiment of the present disclosure.

In addition, in the embodiment of the present disclosure, the SPRS measurement result can be represented by $\phi_i(k)$, for example: the SPRS measurement result from the cell i at a time k (also called carrier phase observation) $\phi_i(k)$ can be represented as follows:

$$\lambda \phi_i(k) = r_i(k) + \lambda^* N_i + w_i$$

Where $r_i(k)$ is the distance from the UE to the cell i, $\lambda$ is the wavelength of SPRS, $N_i$ is integer ambiguity to be solved during positioning calculation, and $w_i$ is the carrier phase measurement error. The carrier phase measurement error is mainly affected by multipath.

In this way, a plurality of $\phi_i(k)$ can be obtained by measuring a plurality of SPRS, so that parameters such as the distance between the UE and each positioning reference device, the integer ambiguity, and the carrier phase measurement error can be calculated, thereby determining the position of the UE with high accuracy.

It should be noted that, in the embodiments of the present disclosure, the positioning of the UE by the above formula is not limited, because when the position of the UE is fixed, the SPRS measurement result is also fixed, then the position of the UE can be determined through this relationship. For example, the UE can also be positioned through other relationships between SPRS measurement results and position.

As an optional implementation, the UE measures SPRSs sent by the plurality of positioning reference devices to obtain a plurality of SPRS measurement results, includes: measuring, by the UE, SPRSs sent by the plurality of positioning reference devices on a plurality of different frequency resources to obtain the plurality of SPRS measurement results, where different positioning reference devices use different frequency resources to send the SPRSs.

In this embodiment, different positioning reference devices can use different frequency resources to send SPRS, for example, different positioning reference devices send SPRS in different subcarriers, so that the UE can measure the different SPRS measurement results to improve the UE positioning accuracy.

Optionally, in this embodiment, the method further includes: obtaining, by the UE, SPRS configuration information of the plurality of positioning reference devices, and the SPRS configuration information of each positioning reference device includes frequency configuration information and time configuration information of the SPRS sent by the positioning reference device.

The measuring, by the UE, SPRS sent by the plurality of positioning reference devices on a plurality of different frequency resources to obtain a plurality of SPRS measurement results, includes: measuring, by the UE, the SPRSs sent by the plurality of positioning reference devices based on the SPRS configuration information of the plurality of positioning reference devices, to obtain a plurality of SPRS measurement results.

The SPRS configuration information of the plurality of positioning reference devices may be sent by the positioning server or a certain positioning reference device, or each positioning reference device may send its own SPRS configuration information, which is not limited herein. Of course, the PRS configuration information can also be obtained, so that the PRS can be measured based on the PRS configuration information. The PRS configuration information and the SPRS configuration information may be obtained through a same message, or the PRS configuration information and the SPRS configuration information are respectively obtained through different methods, which is not limited herein.

In addition, in order to reduce the adjustment of the UE, the above SPRS configuration information can be completed by extending the current 3GPP LTE positioning protocol (LPP) (TS 36.355) and/or positioning protocol A (LPPa). For example, the SPRS configuration information is added in the message for configuring the PRS configuration information in the LTE positioning protocol (LPP) and the positioning protocol A (LPPa), which can reduce the adjustment of the UE positioning process, and can also avoid transmitting SPRS configuration information by additional signaling to save transmission overhead. Of course, in this embodiment, the UE can also obtain PRS configuration information, where the PRS configuration information can refer to 3GPP LTE positioning protocol (LPP) (TS 36.355)

and/or positioning protocol A (LPPa), which is not limited herein. In addition, in the embodiments of the present disclosure, the measurement of PRS may also refer to 3GPP LTE positioning protocol (LPP) (TS 36.355) and/or positioning protocol A (LPPa), which is not described in detail herein.

In this embodiment, the corresponding SPRS may be measured on a corresponding frequency resource at a corresponding time, so as to improve the accuracy of the SPRS measurement, and avoid the power waste caused by the blind measurement of the SPRS by the UE.

Optionally, in the above embodiment, each positioning reference device configures a fixed frequency resource to send the SPRS, or each positioning reference device configures a different frequency to send the SPRS at a different time.

The frequency resource on which each positioning reference device sends the SPRS may be a pre-configured or pre-defined carrier frequency, for example, each cell sends an SPRS for carrier phase positioning at a pre-configured or pre-defined carrier frequency.

A frequency hopping mode is used configure a different frequency by each cell to send the SPRS at a different time. Among them, there may be a plurality of methods for configuring the frequency hopping mode. For example, the frequency hopping mode may depend on the transmission time of the SPRS, the cell ID, the bandwidth for sending the SRPS in the network configuration, and so on.

In this embodiment, it is possible to flexibly configure frequency resources for each positioning reference device to send SPRS.

As an optional implementation, the measuring, by the UE, SPRSs sent by the plurality of positioning reference devices to obtain a plurality of SPRS measurement results, includes: measuring, by the UE, SPRS continuously sent by the plurality of positioning reference devices to obtain the plurality of SPRS measurement results; or measuring, by the UE, SPRSs periodically sent by the plurality of positioning reference devices to obtain the plurality of SPRS measurement results; or measuring, by the UE, SPRSs sent by the plurality of positioning reference devices as needed to obtain the plurality of SPRS measurement results.

In this embodiment, the network can configure the time for sending SRPS for each cell (position reference device of a cell) participating in carrier phase positioning. The time for sending the SRPS can be specifically configured for a cell (the position reference device of the cell) in various ways.

For example, it is configured to continuously transmit SPRS. In this configuration, the positioning reference device of the cell can continuously transmit SPRS on the configured single frequency or a plurality of frequencies without interruption. It is configured to send SPRS periodically. In this configuration, the positioning reference device of the cell can send SPRS based on the configured transmission period, time offset or turn-on (or turn-off duration) at the configured single frequency or a plurality of frequencies. It is configured to start or stop sending SPRS as needed. In this configuration, the positioning reference device of the cell can start or stop sending SPRS based on a certain positioning requirement, which can come from the positioning server or a UE or a base station.

In this embodiment, the positioning reference device can be flexibly configured to send SPRS based on requirements, so as to improve the flexibility of the system.

As an optional embodiment, each PRS measurement result includes: at least one of reference signal time difference (RSTD) and reference signal received power (RSRP).

Each SPRS measurement result includes: an SPRS carrier phase (SPRS-CP) measurement value.

In this embodiment, at least one of RSTD and RSRP of the PRS sent by the positioning reference device can be measured, and the SPRS-CP measurement value of the SPRS sent by the positioning reference device can be measured. Since the measurement error of the SPRS-CP measurement value can be in the order of centimeters or less, the measurement by the SPRS-CP measurement value in combination with at least one of RSTD and RSRP can further improve the positioning accuracy of the UE.

As an optional implementation, subcarrier spacing (SCS) of the subcarriers occupied by the SPRS sent by the plurality of positioning reference devices is smaller than SCS of data communication in a target carrier, and the target carrier includes subcarriers occupied by the SPRS sent by a plurality of positioning reference devices.

Figure 5:
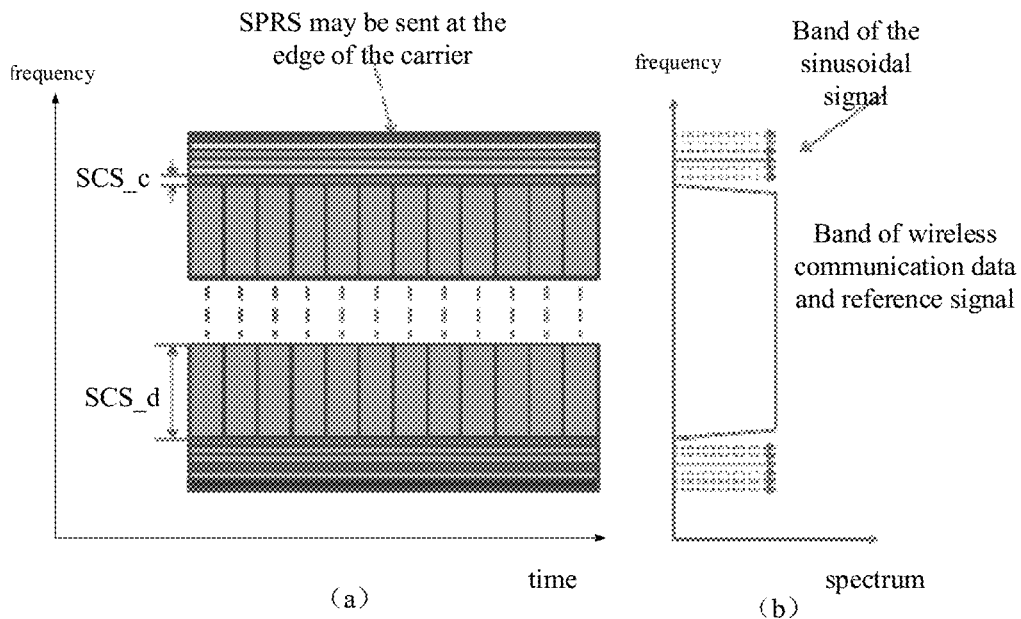
FIG. 5 is a schematic diagram of subcarrier distribution and spectrum for sending SRPS provided by an embodiment of the present disclosure.

It should be noted that since SPRS is a pure sinusoidal carrier signal, the bandwidth of the signal will be very small, so that subcarrier spacing between the carrier frequencies (SCS_c) of SPRS used for UE positioning can be configured to be much smaller than subcarrier spacing of data communication (SCS_d), as shown in FIG. 5(a).

In addition, in the embodiment of the present disclosure, the subcarrier spacing between the carrier frequencies of the SPRS used for UE positioning may mainly consider the frequency error of the radio transmitter of the positioning reference device (e.g., base station) and the Doppler offset of the UE (depending on the speed and carrier frequency of the UE). For example, assuming that the frequency error of the radio transmitter of the base station is less than 0.05 ppm, the speed of the UE is less than 450 km/h, and the carrier frequency is less than 6 GHz, the subcarrier spacing SCS_c between the carrier frequencies of SPRS can be set to less than 3 kHz. In contrast, when the carrier frequency is less than 6 GHz, the subcarrier spacing of 3GPP next-generation system data communication is $15*2^{\mu}$ ($\mu=0,1$) kHz.

In this embodiment, since the SCS of the subcarrier occupied by the SPRS is smaller than the SCS of data communication in the target carrier, the frequency resource of the carrier can be saved.

Optionally, in this embodiment, the subcarriers occupied by the SPRS sent by the plurality of positioning reference devices are located at an edge or a guard band of the target carrier.

Among them, the subcarriers occupied by the above SPRS are implemented at the edge of the carrier or the guard band of the carrier, as shown in FIG. 5(b). In addition, since the SPRS is a pure sinusoidal signal, there is no need to worry about the inter-channel spectrum of adjacent carrier signals caused by the positioning signal, for example, as shown in FIG. 5(b).

In this embodiment, since the SPRS can be transmitted at the carrier edge or the guard band of the carrier at very small sub-carrier intervals, it only needs to be very small or does not even occupy carrier resources of the data communication, frequency resources are saved.

As an optional implementation, the sending the plurality of PRS measurement results and the plurality of SPRS measurement results to the positioning server includes: sending a report message to the positioning server, where the report message includes the plurality of PRS measurement results and information elements for reporting the SPRS measurement results, the information elements include the SPRS measurement results of each SPRS.

The report message may be a report message defined in the current positioning protocol for reporting the PRS measurement result. For example, in this embodiment, the SPRS measurement result (for example: SPRS-CP measurement value) and other positioning measurements (for example at least one of RSTD and RSRP) are reported together to the positioning server or base station of the network for high-precision positioning of the UE. The reporting method can be directly extended by the current 3GPP LTE positioning protocol (LPP) (TS 36.355) and positioning protocol A (LPPa), and an information element (IE) for reporting the SPRS measurement result is added to the report message for reporting PRS measurement results.

In this embodiment, since the plurality of PRS measurement results and the plurality of SPRS measurement results are reported through a same message, the above information element can be directly added to the report message for reporting PRS measurement results defined by the current positioning protocol, thereby reducing changing of the positioning process of the UE and avoiding adding additional messages, and saving power consumption and cost of the UE.

Optionally, in this embodiment, the information element further includes: at least one of a cell identifier corresponding to each SPRS, an SPRS index, a reference time during measurement, and a quality indication of a carrier measurement value.

In this embodiment, at least one of the plurality of PRS measurement results and the plurality of SPRS measurement results, the cell indicator corresponding to each SPRS, the SPRS index, the reference time during measurement, and the quality indication of the carrier measurement value are reported to the positioning server, thereby further improving the positioning accuracy of the UE. For example, LPP/LPPa information elements used to report the SPRS measurement results (for example, SPRS carrier phase measurement) include the cell ID, the SPRS index, the reference time during measurement, the measured SPRS measurement results (for example, carrier phase value) and the quality index of the measured carrier value. After the PRS measurement result (for example, at least one of RSTD and RSRP) and the SPRS measurement result (for example, SPRS-CP) are obtained in this way, the positioning server or the UE determine the position of the UE with high accuracy based on PRS and SPRS configuration information and the positioning measurement value provided by the UE using positioning algorithms in various related arts. In addition, the position information of the transmission antenna of each cell can be combined by the UE with the measured value for positioning.

As an optional embodiment, the method further includes at least one of the following: exchanging, by the UE, with other UEs, the plurality of PRS measurement results and the plurality of SPRS measurement results measured by the UE and the other UEs; exchanging, by the UE, with other UEs, the position information positioned by the UE and the other UEs; sending, by the UE, PRS and SPRS to other UEs; and exchanging, by the UE, the PRS configuration information and SPRS configuration information with other UEs.

The other UEs may be UEs other than the UE to which the method is applied (i.e., the UE described herein).

In this embodiment, if the UE receives a plurality of PRS measurement results and a plurality of SPRS measurement results measured by other UEs, the UE can implement positioning by combining the PRS measurement result and the SPRS measurement result measured by itself with the plurality of PRS measurement results and the plurality of SPRS measurement results measured by other UEs, thereby improving the accuracy of the UE positioning.

In addition, if position information positioned by other UEs are received, the UE can implement positioning by combining the position information, thereby improving the positioning accuracy of the UE.

In addition, in this embodiment, it is also possible to send PRS and SPRS to other UEs, so that other UEs can measure the PRS and SPRS to achieve positioning.

In addition, if the PRS configuration information and SPRS configuration information of other UEs are settled, the PRS and SPRS sent by other UEs can be measured according to these PRS configuration information and SPRS configuration information, thereby improving the accuracy of the measurement.

It should be noted that, the embodiment can be applied to the V2X vehicle cooperative positioning system, and can also be applied to other scenarios, for example, scenarios where network signals are relatively poor, etc., which is not limited herein. In addition, in this embodiment, it is also possible to implement positioning based on PRS and SPRS sent by at least one network side device and at least one vehicle user terminal which implement a V2X vehicle cooperative positioning system.

Figure 6:
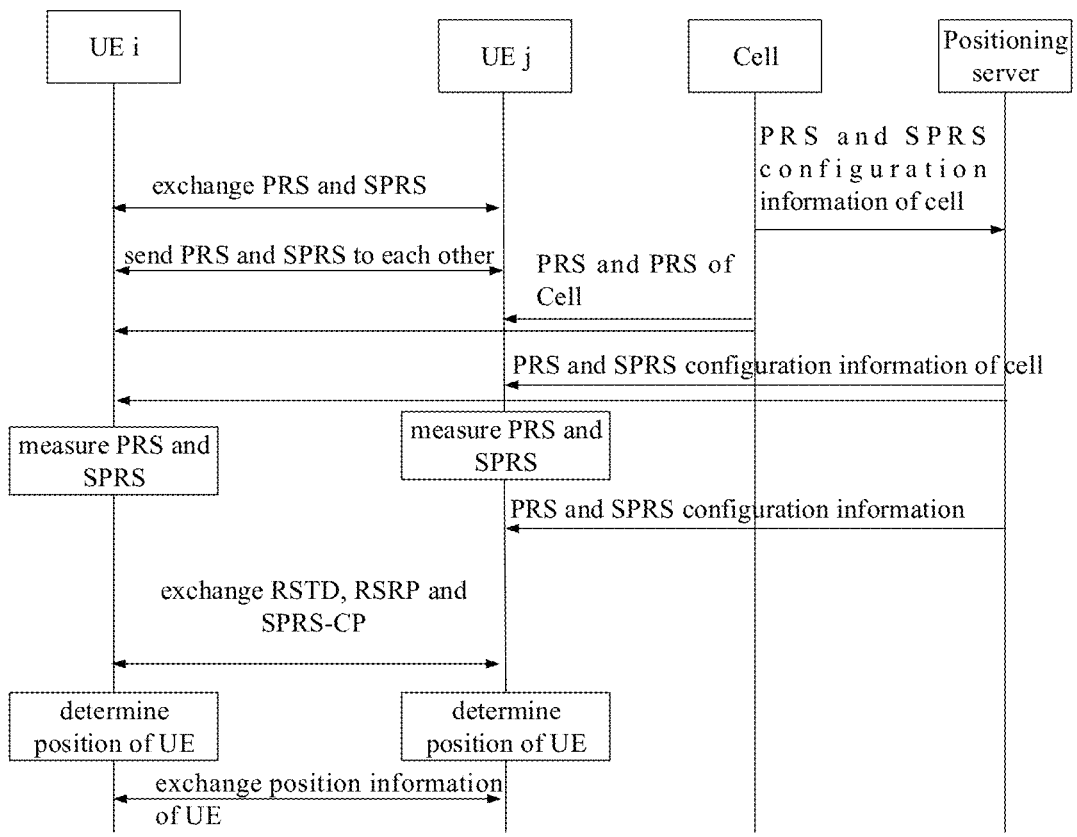
FIG. 6 is a schematic diagram of a positioning method provided by an embodiment of the present disclosure.

For example, taking the UE as a vehicle user terminal as an example (the vehicle user terminal may be an in-vehicle communication device, or may be a UE located inside the vehicle or a UE associated with the vehicle, which is not limited in herein). As shown in FIG. 6, the network side device (shown by a cell in FIG. 6) may send PRSs in each cell and send SPRS for carrier phase positioning at pre-configured or pre-defined carrier frequencies in each cell. In addition, the network can provide PRS and SPRS configuration information related to the cell to the UE at the same time.

The vehicle user terminals can also send PRS and SPRS to each other. The vehicle user terminals can also provide their PRS and SPRS configuration information to each other through direct links (sidelinks). The vehicle user terminals can also provide PRS and SPRS configuration information of their cells to each other through direct links (sidelinks).

Each vehicle user terminal can measure PRS and SPRS according to the received PRS and SPRS configuration information of each neighboring cell and the PRS and SPRS configuration information of other vehicle user terminals.

After that, each vehicle user terminal can exchange positioning measurement values (RSTD, RSRP and SPRS-CP) obtained from each other. Of course, each vehicle user terminal can also estimate its own position by using all the obtained information. At the same time, each vehicle user terminal can share its own positioning estimating value with other vehicle user terminals.

In addition, in this embodiment, it is also possible to implement positioning based on PRS and SPRS sent by a plurality of vehicle user terminals, which implements the V2X vehicle cooperative positioning system. In this way, when implementing positioning between vehicle user terminals, the network side devices may not be involved, so that the UE positioning is applicable to a wider range, for example, in some remote areas without base stations, positioning may be implemented among a plurality of UEs.

As an optional implementation, the plurality of positioning reference devices include a plurality of network side devices; or the plurality of positioning reference devices include at least one network side device and at least one other UE; or the plurality of positioning reference devices include a plurality of other UEs.

In this embodiment, positioning can be implemented based on PRS and SPRS sent by the plurality of network side devices, so as to implement positioning in a wireless communication system.

Figure 7:
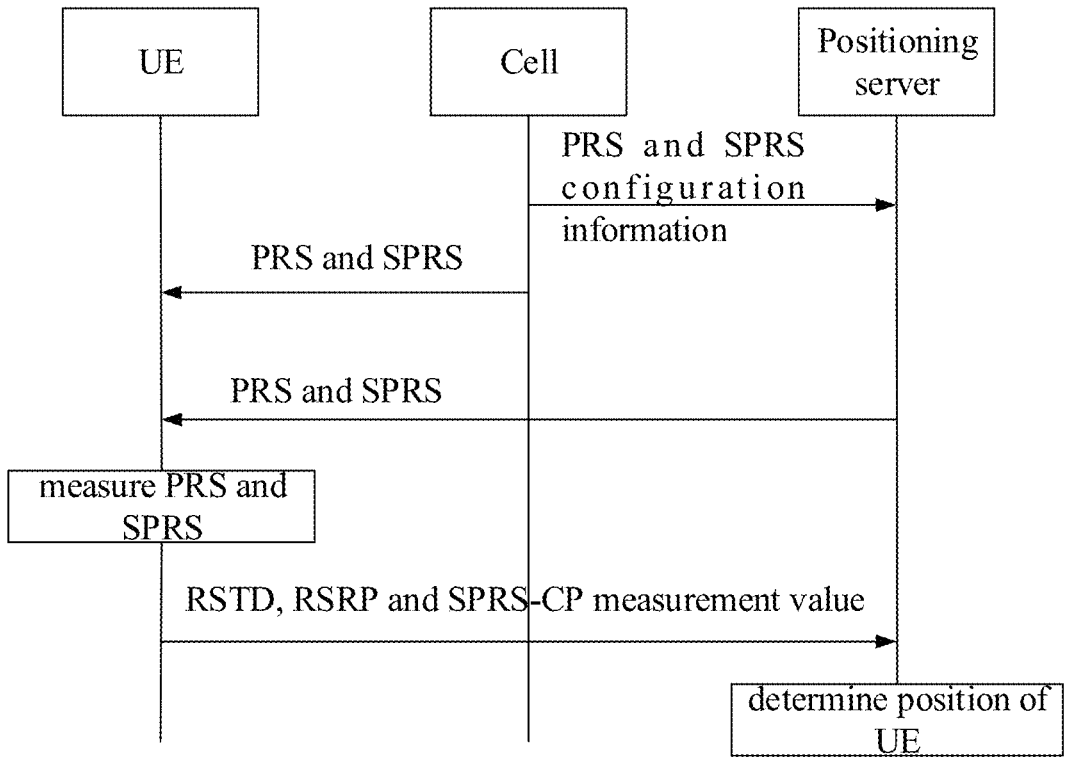
FIG. 7 is another schematic diagram of a positioning method provided by an embodiment of the present disclosure.

For example, as shown in FIG. 7, a plurality of network side devices (indicated by cells in FIG. 7) send PRS and SPRS to the UE, and can also send PRS and SPRS configuration information to the positioning server, and the positioning server then sends the PRS and SPRS configuration information to the UE. The UE measures PRS and SPRS to obtain RSTD, RSRP and SPRS-CP measurement values, and reports the RSTD, RSRP and SPRS-CP measurement values to the positioning server, so that the positioning server can determine the position of the UE based on RSTD, RSRP and SPRS-CP measurement values.

In addition, in this embodiment, positioning can also be implemented based on the PRS and SPRS sent by at least one network side device and at least one other UE, that is, both the network side device and other UEs can send PRS and SPRS to the UE, to further improve the positioning accuracy of UE. In addition, the network side device and other UEs can also send corresponding configuration information. In this embodiment, the V2X vehicle cooperative positioning system or other scenarios where positioning is implemented between UEs can be implemented, for example, as shown in FIG. 6.

In addition, in this embodiment, the UE can also be positioned based on the PRS and SPRS sent by a plurality of other UEs, so that the UE can also be positioned without the participation of the network side device.

It should be noted that various optional implementations introduced in the embodiments of the present disclosure may be implemented in combination with each other, or may be implemented separately, which is not limited herein.

In this way, in the embodiment of the present disclosure, the UE measures the positioning reference signals PRS sent by the plurality of positioning reference devices to obtain the plurality of PRS measurement results; the UE measures the sinusoidal carrier positioning reference signals SPRS sent by the plurality of positioning reference devices to obtain the plurality of SPRS measurement results; the UE performs a positioning operation based on the plurality of PRS measurement results and the plurality of SPRS measurement results. The positioning operation includes: sending the plurality of PRS measurement results and the plurality of SPRS measurement results to the positioning server, so that the positioning server determines the position of the UE according to the plurality of PRS measurement results and the plurality of SPRS measurement results; or the positioning operation includes: the UE determines the position of the UE according to the plurality of PRS measurement results and the plurality of SPRS measurement results. Since the position of the UE can be determined according to the plurality of PRS measurement results and the plurality of SPRS measurement results, the positioning accuracy of UE can be improved.

Figure 8:
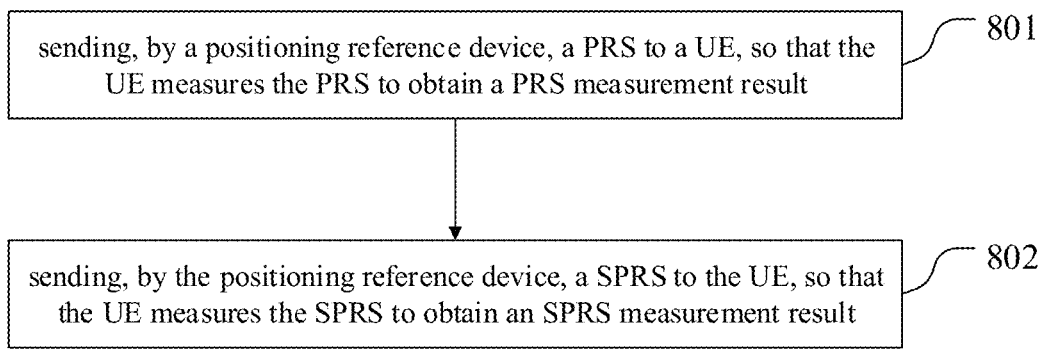
FIG. 8 is a flowchart of a positioning method provided by an embodiment of the present disclosure.

FIG. 8 is a flowchart of another positioning method according to an embodiment of the present disclosure. As shown in FIG. 8, it includes the following steps.

801. sending, by a positioning reference device, a PRS to a UE, so that the UE measures the PRS to obtain a PRS measurement result.

802. sending, by the positioning reference device, a SPRS to the UE, so that the UE measures the SPRS to obtain an SPRS measurement result.

The PRS measurement result and the SPRS measurement result are used for positioning of the UE.

Optionally, different positioning reference devices send SPRSs to UEs through different frequency resources.

Optionally, the method further includes: sending, by the positioning reference device, SPRS configuration information to the UE, and the SPRS configuration information includes frequency configuration information and time configuration information on which the positioning reference device sends SPRS.

Optionally, each positioning reference device sends the SPRS on a fixed frequency resource, or each positioning reference device sends the SPRS on a different frequency at a different time.

Optionally, the sending, by the positioning reference device, the SPRS to the UE includes: the positioning reference device continuously sending SPRS to the UE; or the positioning reference device periodically sending SPRS to the UE; or the positioning reference device sending the SPRS to the UE as needed.

Optionally, the SCS of the subcarrier occupied by the SPRS sent by the positioning reference device is smaller than the SCS of data communication in the target carrier, and the target carrier includes the subcarrier occupied by the SPRS sent by the positioning reference device.

Optionally, the subcarrier occupied by the SPRS sent by the positioning reference device is located at an edge or a guard band of the target carrier.

Optionally, the positioning reference device is a network side device or another UE.

In addition, when the positioning reference device is a network side device, other UEs may also send PRS and SPRS to the UEs in steps 801 and 802, and the operation of other UEs on the UE in step 801 and step 802 may refer to the positioning reference device. Similarly, if the positioning reference device is another UE, the network side device may also send PRS and SPRS to the UE in step 801 and step 802, and the operation of network side device on the UE in steps 801 and 802 may refer to the positioning reference device. Of course, in some scenarios, the UE may only be positioned based on the PRS and SPRS sent by the network side device or other UEs, which is not limited herein.

It should be noted that this embodiment is an implementation of the positioning reference device corresponding to the embodiment shown in FIG. 2. The specific implementation may refer to the relevant description of the embodiment shown in FIG. 2. The repeated content will not be described in the embodiment, and the same beneficial effects can also be achieved.

Figure 9:
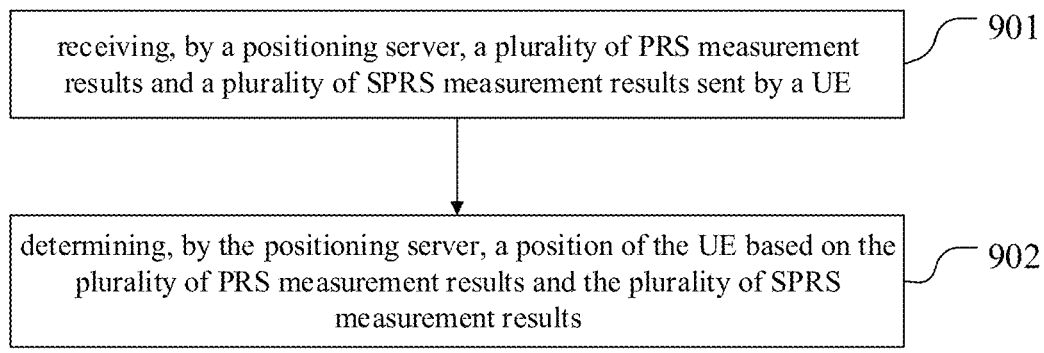
FIG. 9 is another flowchart of a positioning method provided by an embodiment of the present disclosure.

FIG. 9 is a flowchart of another positioning method provided by an embodiment of the present disclosure. As shown in FIG. 9, it includes the following steps.

901. receiving, by a positioning server, a plurality of PRS measurement results and a plurality of SPRS measurement results sent by a UE;

902. determining, by the positioning server, a position of the UE based on the plurality of PRS measurement results and the plurality of SPRS measurement results.

Optionally, each PRS measurement result includes: at least one of RSTD and RSRP. Each SPRS measurement result includes an SPRS-CP measurement value.

Optionally, the receiving, by the positioning server, a plurality of PRS measurement results and a plurality of SPRS measurement results sent by the UE includes: receiving, by the positioning server, a report message sent by the UE, where the report message includes the plurality of PRS measurement results and information elements for reporting SPRS measurement results, the information elements include SPRS measurement result for each SPRS.

Optionally, the information element further includes: at least one of a cell identifier corresponding to each SPRS, an SPRS index, a reference time during measurement, and a quality indication of a carrier measurement value.

It should be noted that this embodiment is an implementation of the positioning server corresponding to the embodiment shown in FIG. 2. The specific implementation refers to the related description of the embodiment shown in FIG. 2. The repeated content will not be described herein, and the same beneficial effects can also be achieved.

Figure 10:
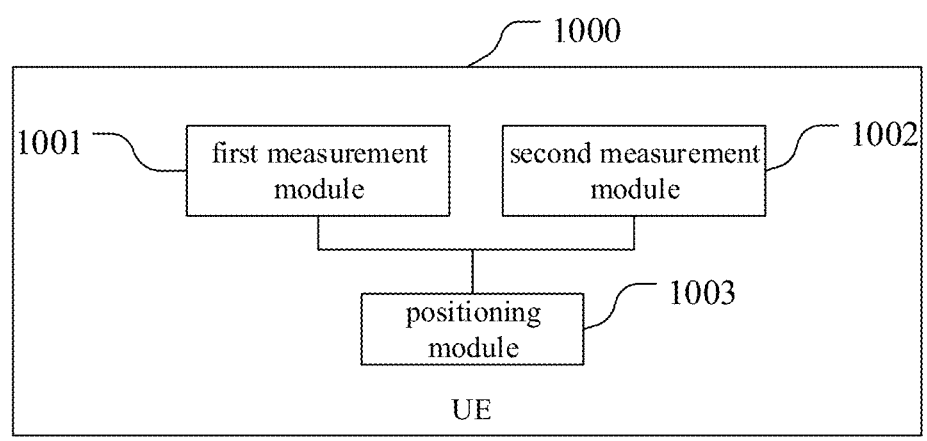
FIG. 10 is a structural schematic diagram of a UE provided by an embodiment of the present disclosure.

FIG. 10 is a structural diagram of a UE according to an embodiment of the present disclosure. As shown in FIG. 10, the UE 1000 includes: a first measurement module 1001, configured to measure PRSs sent by a plurality of positioning reference devices to obtain a plurality of PRS measurement results; a second measurement module 1002, configured to measure SPRSs sent by the plurality of positioning reference devices to obtain a plurality of SPRS measurement results; and a positioning module 1003, configured to perform a positioning operation based on the plurality of PRS measurement results and the plurality of SPRS measurement results.

The positioning operation includes: sending the plurality of PRS measurement results and the plurality of SPRS measurement results to a positioning server, so that the positioning server determines the position of the UE based on the plurality of PRS measurement results and the plurality of SPRS measurement results. Alternatively, the positioning operation includes the UE determines the position of the UE based on the plurality of PRS measurement results and the plurality of SPRS measurement results.

Optionally, the second measurement module 1002 is configured to measure the SPRSs sent by the plurality of positioning reference devices on a plurality of different frequency resources to obtain the plurality of SPRS measurement results, where different positioning reference devices use different frequency resources to send the SPRSs.

Figure 11:
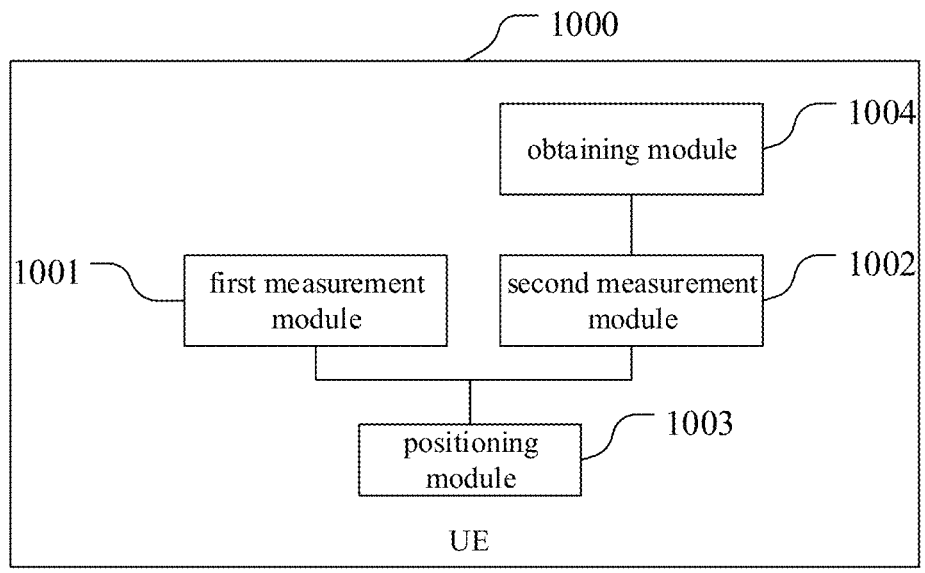
FIG. 11 is another structural schematic diagram of a UE provided by an embodiment of the present disclosure.

Optionally, as shown in FIG. 11, the UE 1000 further includes: an obtaining module 1004, configured to obtain SPRS configuration information of the plurality of positioning reference devices, and the SPRS configuration information of each positioning reference device includes frequency configuration information and time configuration information on which the positioning reference device sends the SPRS. The second measurement module 1002 is configured to measure the SPRSs sent by the plurality of positioning reference devices based on the SPRS configuration information of the plurality of positioning reference devices, to obtain the plurality of SPRS measurement results.

Optionally, each positioning reference device configures a fixed frequency resource to send the SPRS, or each positioning reference device configures a different frequency to send the SPRS at a different time.

Figure 12:
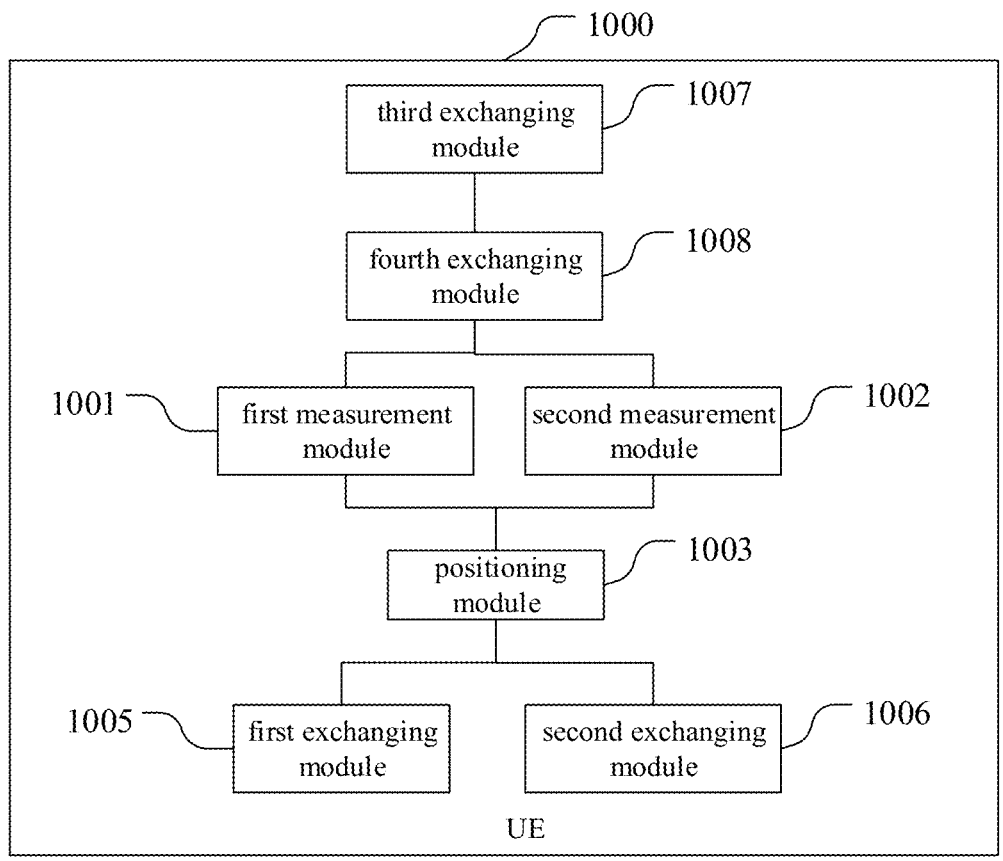
FIG. 12 is yet another structural schematic diagram of a UE provided by an embodiment of the present disclosure.

Optionally, as shown in FIG. 12, the UE 1000 further includes at least one of the following: a first exchanging module 1005, configured to exchange a plurality of PRS measurement results and a plurality of SPRS measurement results with other UEs; a second exchanging module 1006, configured to exchange respective position information with other UEs; a third exchanging module 1007, configured to send PRS and SPRS to other UEs; and a fourth exchanging module 1008, configured to exchange respective PRS configuration information and SPRS configuration information with other UEs.

Optionally, the second measurement module 1002 is configured to measure the SPRSs continuously sent by the plurality of positioning reference devices to obtain the plurality of SPRS measurement results; or the second measurement module 1002 is configured to measure the SPRSs periodically sent by the plurality of positioning reference devices to obtain the plurality of SPRS measurement results; or the second measurement module 1002 is configured to measure the SPRSs sent by the plurality of positioning reference devices as needed to obtain the plurality of SPRS measurement results.

Optionally, each PRS measurement result includes: at least one of RSTD and RSRP. Each SPRS measurement result includes: an SPRS-CP measurement value.

Optionally, SCS of the subcarriers occupied by the SPRS sent by the plurality of positioning reference devices is smaller than SCS of data communication in the target carrier, and the target carrier includes subcarriers occupied by the SPRS sent by the plurality of positioning reference devices.

Optionally, the subcarriers occupied by the SPRS sent by the plurality of positioning reference devices are located at an edge or a guard band of the target carrier.

Optionally, the sending the plurality of PRS measurement results and the plurality of SPRS measurement results to the positioning server includes: sending a report message to the positioning server, where the report message includes the plurality of PRS measurement results and information elements for reporting the SPRS measurement results, the information elements include the SPRS measurement results of each SPRS.

Optionally, the information element further includes: at least one of a cell identifier corresponding to each SPRS, an SPRS index, a reference time during measurement, and a quality indication of a carrier measurement value.

Optionally, the plurality of positioning reference devices include a plurality of network side devices; or the plurality of positioning reference devices include at least one network side device and at least one other UE; or the plurality of positioning reference devices include a plurality of other UEs.

It should be noted that the above UE 1000 in this embodiment may be a UE of any implementation in the method embodiment, and any implementation of the UE in the method embodiment may be implemented by the UE 1000 in the embodiment and the same beneficial effects are achieved, which will not be repeated herein.

Figure 13:
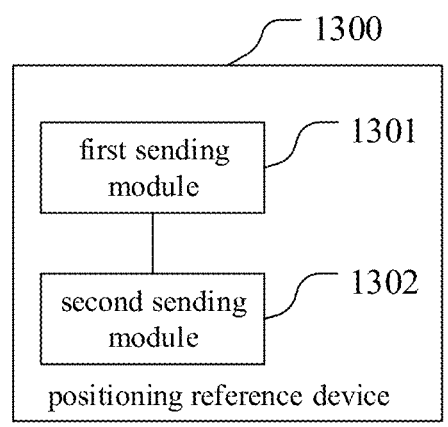
FIG. 13 is a structural schematic diagram of a positioning reference device provided by an embodiment of the present disclosure.

FIG. 13 is a structural diagram of a positioning reference device provided by an embodiment of the present disclosure. As shown in FIG. 13, the positioning reference device 1300 includes: a first sending module 1301, configured to send a PRS to a UE, so that the UE measures the PRS to obtain a PRS measurement result; a second sending module 1302, configured to send an SPRS to the UE, so that the UE measures the SPRS to obtain an SPRS measurement result. The PRS measurement result and the SPRS measurement result are used for positioning of the UE.

Different positioning reference devices send SPRS to UEs through different frequency resources.

Figure 14:
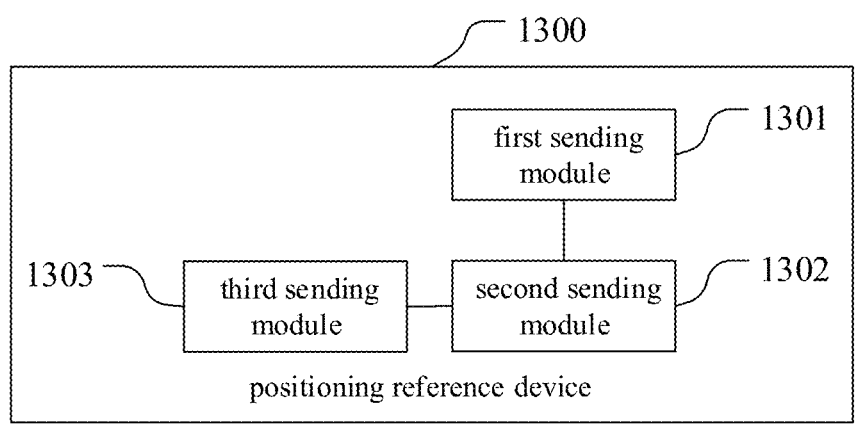
FIG. 14 is another structural schematic diagram of a positioning reference device provided by an embodiment of the present disclosure.

Optionally, as shown in FIG. 14, the positioning reference device 1300 further includes: a third sending module 1303, configured to send SPRS configuration information to the UE, and the SPRS configuration information includes frequency configuration information and time configuration information on which the positioning reference device sends the SPRS.

Optionally, each positioning reference device sends the SPRS on a fixed frequency resource, or each positioning reference device sends the SPRS on a different frequency at a different time.

Optionally, the second sending module 1302 is used by the positioning reference device to continuously send SPRS to the UE; or periodically send SPRS to the UE; or send SPRS to the UE as needed.

Optionally, the SCS of the subcarrier occupied by the SPRS sent by the positioning reference device is smaller than the SCS of data communication in the target carrier, and the target carrier includes the subcarrier occupied by the SPRS sent by the positioning reference device.

Optionally, the subcarrier occupied by the SPRS sent by the positioning reference device is located at an edge or a guard band of the target carrier.

Optionally, the positioning reference device is a network side device or another UE.

It should be noted that the above-mentioned positioning reference device 1300 in this embodiment may be a positioning reference device in any implementation in the method embodiment of the present disclosure, and any implementation of the positioning reference device in the method embodiment in the present disclosure can be implemented by the above-mentioned positioning reference device 1300 in this embodiment, and the same beneficial effects are achieved, which will not be repeated herein.

Figure 15:
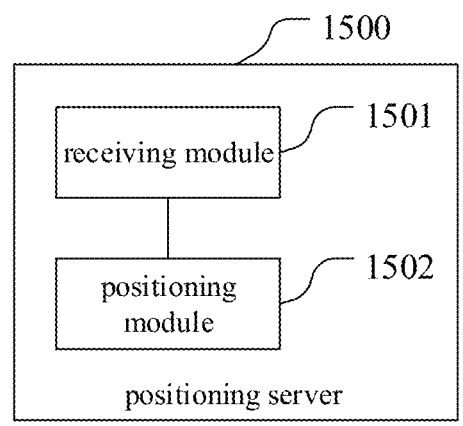
FIG. 15 is a structural schematic diagram of a positioning server provided by an embodiment of the present disclosure.

FIG. 15 is a structural diagram of a positioning server according to an embodiment of the present disclosure. As shown in FIG. 15, the positioning server 1500 includes: a receiving module 1501, configured to receive a plurality of PRS measurement results and a plurality of SPRS measurement results sent by a UE; a positioning module 1502, configured to determine a position of the UE based on the plurality of PRS measurement results and the plurality of SPRS measurement results.

Optionally, each PRS measurement result includes: at least one of RSTD and RSRP. Each SPRS measurement result includes an SPRS-CP measurement value.

Optionally, the receiving module 1501 is configured to receive a report message sent by the UE, where the report message includes the plurality of PRS measurement results and information elements for reporting SPRS measurement results, the information elements include SPRS measurement result for each SPRS.

Optionally, the information element further includes: at least one of a cell identifier corresponding to each SPRS, an SPRS index, a reference time during measurement, and a quality indication of a carrier measurement value.

It should be noted that the above-mentioned positioning server 1500 in this embodiment may be a positioning server in any implementation in the method embodiment of the present disclosure, and any implementation of the positioning server in the method embodiment in the present disclosure may be implemented by the positioning server 1500 in the embodiment, the same beneficial effects are achieved, which will not be repeated herein.

Figure 16:
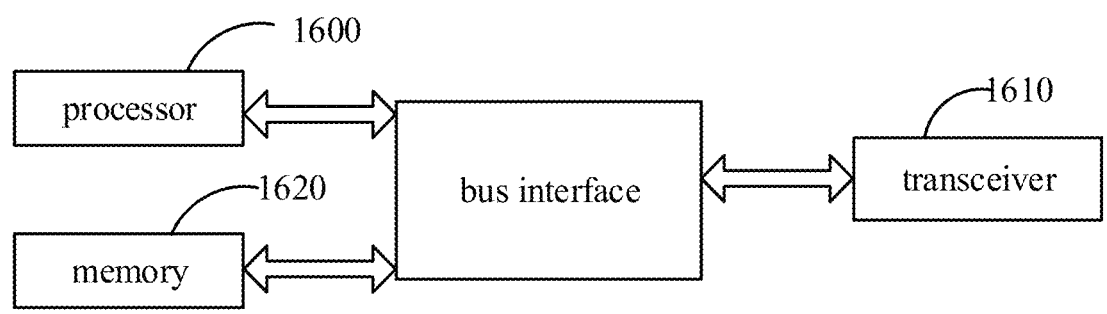
FIG. 16 is another structural schematic diagram of a UE provided by an embodiment of the present disclosure.

FIG. 16 is a structural diagram of another UE provided by an embodiment of the present disclosure. As shown in FIG. 16, the UE includes: a transceiver 1610, a memory 1620, a processor 1600, and a computer program stored in the memory 1620 and executed by the processor.

The transceiver 1610 is configured to measure PRSs sent by a plurality of positioning reference devices to obtain a plurality of PRS measurement results; measure SPRSs sent by the plurality of positioning reference devices to obtain a plurality of SPRS Measurement results; perform a positioning operation based on the plurality of PRS measurement results and the plurality of SPRS measurement results. The positioning operation includes: sending the plurality of PRS measurement results and the plurality of SPRS measurement results to a positioning server, so that the positioning server determines the position of the UE based on the plurality of PRS measurement results and the plurality of SPRS measurement results. Alternatively, the positioning operation includes the UE determines the position of the UE based on the plurality of PRS measurement results and the plurality of SPRS measurement results.

Or the transceiver 1610 is configured to measure the PRSs sent by the plurality of positioning reference devices to obtain the plurality of PRS measurement results; measure the SPRSs sent by the plurality of positioning reference devices to obtain the plurality of SPRS Measurement result.

The processor 1600 is used to read the program in the memory 1620 and perform the following processes: performing a positioning operation based on the plurality of PRS measurement results and the plurality of SPRS measurement results. The UE determines the position of the UE based on the plurality of PRS measurement results and the plurality of SPRS measurement results.

Among them, the transceiver 1610 can be used to receive and send data under the control of the processor 1600.

In FIG. 16, the bus architecture may include any number of interconnected buses and bridges, specifically various circuits of one or more processors represented by the processor 1600 and the memory represented by the memory 1620 are linked together. The bus architecture can also link various other circuits such as peripheral devices, voltage regulators, and power management circuits, etc., which are well known in the art, and therefore, they will not be further described in the disclosure. The bus interface provides an interface. The transceiver 1610 may be a plurality of elements, including a transmitter and a receiver, and provides a unit for communicating with various other devices on a transmission medium.

The processor 1600 is responsible for managing the bus architecture and general processing, and the memory 1620 may store data used by the processor 1600 to perform operations.

It should be noted that the memory 1620 is not limited to the UE, and the memory 1620 and the processor 1600 can be separated in different geographic positions.

Optionally, the measuring SPRSs sent by the plurality of positioning reference devices to obtain a plurality of SPRS measurement results includes: measuring SPRSs sent by the plurality of positioning reference devices on a plurality of different frequency resources to obtain the plurality of SPRS measurement results, where different positioning reference devices use different frequency resources to send the SPRSs.

Optionally, the transceiver 1610 or the processor 1600 is also used to: obtain SPRS configuration information of the plurality of positioning reference devices, and the SPRS configuration information of each positioning reference device includes frequency configuration information and time configuration information on which the positioning reference device sends the SPRS.

The measuring SPRSs sent by the plurality of positioning reference devices on a plurality of different frequency resources to obtain a plurality of SPRS measurement results includes: measuring the SPRSs sent by the plurality of positioning reference devices based on the SPRS configuration information of the plurality of positioning reference devices, to obtain the plurality of SPRS measurement results.

Optionally, each positioning reference device configures a fixed frequency resource to send the SPRS, or each positioning reference device configures a different frequency to send the SPRS at a different time.

Optionally, the transceiver 1610 is also used to perform at least one of the following: exchanging the plurality of PRS measurement results and the plurality of SPRS measurement results with other UEs; exchanging respective position information with other UEs; sending PRS and SPRS to other UEs; and exchanging respective PRS configuration information and SPRS configuration information with other UEs.

Optionally, the measuring SPRSs sent by the plurality of positioning reference devices to obtain a plurality of SPRS measurement results includes: measuring SPRS continuously sent by the plurality of positioning reference devices to obtain the plurality of SPRS measurement results; or measuring SPRSs periodically sent by the plurality of positioning reference devices to obtain the plurality of SPRS measurement results; or measuring SPRSs sent by the plurality of positioning reference devices as needed to obtain the plurality of SPRS measurement results.

Optionally, each PRS measurement result includes: at least one of RSTD and RSRP. Each SPRS measurement result includes: an SPRS-CP measurement value.

Optionally, SCS of the subcarriers occupied by the SPRS sent by the plurality of positioning reference devices is smaller than SCS of data communication in the target carrier, and the target carrier includes subcarriers occupied by the SPRS sent by the plurality of positioning reference devices.

Optionally, the subcarriers occupied by the SPRS sent by the plurality of positioning reference devices are located at an edge or a guard band of the target carrier.

Optionally, the sending the plurality of PRS measurement results and the plurality of SPRS measurement results to the positioning server includes: sending a report message to the positioning server, where the report message includes the plurality of PRS measurement results and information elements for reporting SPRS measurement results, where the information elements include the SPRS measurement result of each SPRS.

Optionally, the information elements further include: at least one of a cell identifier corresponding to each SPRS, an SPRS index, a reference time during measurement, and a quality indication of a carrier measurement value.

Optionally, the plurality of positioning reference devices include a plurality of network side devices; or the plurality of positioning reference devices include at least one network side device and at least one other UE; or the plurality of positioning reference devices include a plurality of other UEs.

It should be noted that the above UE in this embodiment may be a UE in any implementation in the method embodiment of the present disclosure, and any implementation of the UE in the method embodiment may be implemented by the UE in this embodiment. The same beneficial effects are achieved, which will not be repeated herein.

Figure 17:
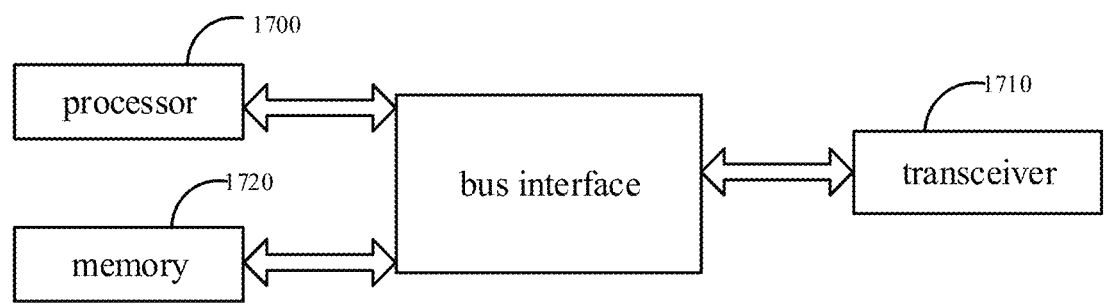
FIG. 17 is another structural schematic diagram of a positioning reference device provided by an embodiment of the present disclosure.

FIG. 17 is a structural diagram of another positioning reference device provided by an embodiment of the present disclosure. As shown in FIG. 17, the positioning reference device includes: a transceiver 1710, a memory 1720, a processor 1700, and a computer program stored in the memory 1720 and executed by the processor.

The transceiver 1710 is configured to send a PRS to a UE, so that the UE measures the PRS to obtain a PRS measurement result; send an SPRS to the UE, so that the UE measures the SPRS to obtain an SPRS measurement result. The PRS measurement result and the SPRS measurement result are used for positioning of the UE.

Among them, the transceiver 1710 can be used to receive and send data under the control of the processor 1700.

In FIG. 17, the bus architecture may include any number of interconnected buses and bridges, specifically various circuits of one or more processors represented by the processor 1700 and the memory represented by the memory 1720 are linked together. The bus architecture can also link various other circuits such as peripheral devices, voltage regulators, and power management circuits, etc., which are well known in the art, and therefore, they will not be further described in the disclosure. The bus interface provides an interface. The transceiver 1710 may be a plurality of elements, including a transmitter and a receiver, and provides a unit for communicating with various other devices on a transmission medium.

The processor 1700 is responsible for managing the bus architecture and general processing, and the memory 1720 may store data used by the processor 1700 to perform operations.

It should be noted that the memory 1720 is not limited to the positioning reference device, and the memory 1720 and the processor 1700 may be separated in different geographic positions.

Optionally, different positioning reference devices send SPRS to the UE through different frequency resources.

Optionally, the transceiver 1710 is also used to: send SPRS configuration information to the UE, where the SPRS configuration information includes frequency configuration information and time configuration information on which the positioning reference device sends the SPRS.

Optionally, each positioning reference device sends the SPRS on a fixed frequency resource, or each positioning reference device sends the SPRS on a different frequency at a different time.

Optionally, the sending the SPRS to the UE includes: continuously sending the SPRS to the UE; or periodically sending the SPRS to the UE; or sending the SPRS to the UE as needed.

Optionally, the SCS of the subcarrier occupied by the SPRS sent by the positioning reference device is smaller than the SCS of data communication in the target carrier, and the target carrier includes the subcarrier occupied by the SPRS sent by the positioning reference device.

Optionally, the subcarrier occupied by the SPRS sent by the positioning reference device is located at an edge or a guard band of the target carrier.

Optionally, the positioning reference device is a network side device or another UE.

It should be noted that the above-mentioned positioning reference device in this embodiment may be a positioning reference device in any implementation in the method embodiment of the present disclosure, and any implementation of the positioning reference device in the method embodiment of the present disclosure may be implemented by the above-mentioned positioning reference device in this embodiment, and the same beneficial effects are achieved, which will not be repeated here.

Figure 18:
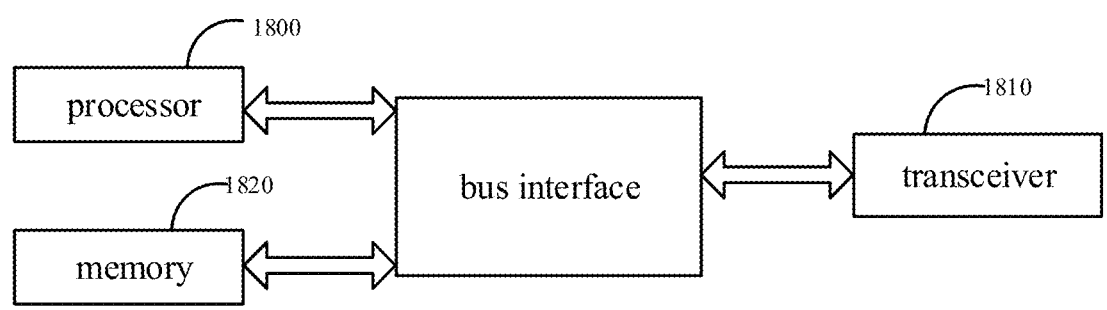
FIG. 18 is another structural schematic diagram of a positioning server provided by an embodiment of the present disclosure.

FIG. 18 is a structural diagram of another positioning server provided by an embodiment of the present disclosure. As shown in FIG. 18, the positioning server includes: a transceiver 1810, a memory 1820, a processor 1800, and a computer program stored in the memory 1820 and executed by the processor.

The transceiver 1810 is configured to receive a plurality of PRS measurement results and a plurality of SPRS measurement results sent by a UE; determine a position of the UE based on the plurality of PRS measurement results and the plurality of SPRS measurement results.

Or the transceiver 1810 is configured to receive the plurality of PRS measurement results and the plurality of SPRS measurement results sent by the UE.

The processor 1800 is used to read the program in the memory 1820 and perform the following processes: determining the position of the UE based on the plurality of PRS measurement results and the plurality of SPRS measurement results.

Among them, the transceiver 1810 can be used to receive and send data under the control of the processor 1800.

In FIG. 18, the bus architecture may include any number of interconnected buses and bridges, specifically, various circuits of one or more processors represented by the processor 1800 and the memory represented by the memory 1820 are linked together. The bus architecture can also link various other circuits such as peripheral devices, voltage regulators, and power management circuits, etc., which are well known in the art, and therefore, they will not be further described in the disclosure. The bus interface provides an interface. The transceiver 1810 may be a plurality of elements, including a transmitter and a receiver, and provides a unit for communicating with various other devices on a transmission medium.

The processor 1800 is responsible for managing the bus architecture and general processing, and the memory 1820 may store data used by the processor 1800 to perform operations.

It should be noted that the memory 1820 is not limited to being located only on the positioning server, and the memory 1820 and the processor 1800 may be separated in different geographic positions.

Optionally, each PRS measurement result includes: at least one of RSTD and RSRP. Each SPRS measurement result includes an SPRS-CP measurement value.

Optionally, the receiving a plurality of PRS measurement results and a plurality of SPRS measurement results sent by the UE includes: receiving a report message sent by the UE, the report message including the plurality of PRS measurement results and information elements for reporting SPRS measurement results, wherein the information elements include SPRS measurement result of each SPRS.

Optionally, the information elements further include: at least one of a cell identifier corresponding to each SPRS, an SPRS index, a reference time during measurement, and a quality indication of a carrier measurement value.

It should be noted that the above-mentioned positioning server in this embodiment may be a positioning server in any implementation in the method embodiment of the present disclosure, and any implementation of the positioning server in the method embodiment of the present disclosure may be implemented by the above-mentioned positioning server in this embodiment, the same beneficial effects are achieved, which will not be repeated herein.

An embodiment of the present disclosure also provides a computer-readable storage medium on which a computer program is stored, when executed by a processor to implement the steps in the positioning method on the UE side provided by the embodiment of the present disclosure, or implements the steps in the positioning method on the positioning reference device side provided by the embodiments of the present disclosure, or implement the steps in the positioning method on the positioning server side provided by the embodiments of the present disclosure.

In the several embodiments provided in this application, it should be understood that the disclosed method and device may be implemented in other ways. For example, the device embodiments described above are only schematic. For example, the division of the units is only a division of logical functions. In actual implementation, there may be other divisions, for example, a plurality of units or components may be combined or can be integrated into another system, or some features can be ignored, or not implemented. In addition, the displayed or discussed mutual coupling or direct coupling or communication connection may be indirect coupling or communication connection through some interfaces, devices or units, and may be in electrical, mechanical or other forms.

In addition, each functional unit in each embodiment of the present disclosure may be integrated into one processing unit, or each unit may be physically included separately, or two or more units may be integrated into one unit. The above integrated unit can be implemented in the form of hardware, or in the form of hardware plus software functional units.

The above integrated unit implemented in the form of a software functional unit may be stored in a computer-readable storage medium. The above software functional unit is stored in a storage medium, and includes several instructions to enable a computer device (which may be a personal computer, a server, or a network device, etc.) to perform some steps of the transceiving method described in the embodiments of the present disclosure. The aforementioned storage media include: a U disk, a mobile hard disk, a read-only memory (ROM), a random access memory (RAM), a magnetic disk or an optical disk and other media that can store program codes.

It will be apparent to those skilled in the art that various modifications and variations can be made to the embodiments of the disclosure without departing from the spirit and scope of the disclosure, the disclosure is also intended to include such modifications and variations.

What is claimed is:

1. A positioning method, comprising:
   measuring, by a user equipment (UE), positioning reference signals (PRSs) sent by a plurality of positioning reference devices to obtain a plurality of PRS measurement results;
   measuring, by the UE, sinusoidal positioning reference signals (SPRSs) sent by the plurality of positioning reference devices to obtain a plurality of SPRS measurement results;
   performing, by the UE, a positioning operation based on the plurality of PRS measurement results and the plurality of SPRS measurement results,
   wherein the positioning operation comprises: sending the plurality of PRS measurement results and the plurality of SPRS measurement results to a positioning server, so that the positioning server determines a position of the UE based on the plurality of PRS measurement results and the plurality of SPRS measurement results; or
   the positioning operation comprises: determining, by the UE, the position of the UE based on the plurality of PRS measurement results and the plurality of SPRS measurement results;
   wherein the sending the plurality of PRS measurement results and the plurality of SPRS measurement results to a positioning server comprises:
   sending a report message to the positioning server, wherein the report message includes the plurality of PRS measurement results and information elements for reporting the plurality of SPRS measurement results, the information elements include the SPRS measurement result of each SPRS;
   wherein the information elements further comprise: at least one of a cell identifier corresponding to each SPRS, an SPRS index, a reference time during measurement, and a quality indication of a carrier measurement value.

2. The positioning method according to claim 1, wherein the measuring, by the UE, sinusoidal positioning reference signals (SPRSs) sent by the plurality of positioning reference devices to obtain a plurality of SPRS measurement results comprises:

measuring the SPRSs sent by the plurality of positioning reference devices on a plurality of different frequency resources to obtain the plurality of SPRS measurement results, wherein different positioning reference devices use different frequency resources to send the SPRSs.

3. The positioning method according to claim 2, further comprising:

obtaining by the UE, SPRS configuration information of the plurality of positioning reference devices, and the SPRS configuration information of each positioning reference device includes frequency configuration information and time configuration information on which the positioning reference device sends the SPRS;

the measuring the SPRSs sent by the plurality of positioning reference devices on a plurality of different frequency resources to obtain the plurality of SPRS measurement results comprises:

measuring, by the UE, the SPRSs sent by the plurality of positioning reference devices based on the SPRS configuration information of the plurality of positioning reference devices, to obtain the plurality of SPRS measurement results.

4. The positioning method according to claim 2, wherein each positioning reference device configures a fixed frequency resource to send the SPRS, or each positioning reference device configures a different frequency to send the SPRS at a different time.

5. The positioning method according to claim 1, further comprising at least one of:

exchanging, by the UE, the plurality of PRS measurement results and the plurality of SPRS measurement results with other UEs;

exchanging, by the UE, respective position information with other UEs;

sending, by the UE, PRS and SPRS to other UEs; and exchanging, by the UE, respective PRS configuration information and SPRS configuration information with other UEs.

6. The positioning method according to claim 1, wherein the measuring the SPRSs sent by the plurality of positioning reference devices to obtain the plurality of SPRS measurement results comprises:

measuring, by the UE, the SPRSs continuously sent by the plurality of positioning reference devices to obtain the plurality of SPRS measurement results; or measuring, by the UE, the SPRSs periodically sent by the plurality of positioning reference devices to obtain the plurality of SPRS measurement results; or measuring, by the UE, the SPRSs sent by the plurality of positioning reference devices as needed to obtain the plurality of SPRS measurement results.

7. The positioning method according to claim 1, wherein at least one of reference signal time difference (RSTD) and reference signal received power (RSRP);

each SPRS measurement result comprises an SPRS carrier phase (SPRS-CP) measurement value.

8. The positioning method according to claim 1, wherein the plurality of positioning reference devices comprise a plurality of network side devices; or the plurality of positioning reference devices comprise at least one network side device and at least one other UE; or the plurality of positioning reference devices comprise a plurality of other UEs.

9. A positioning method, comprising:

sending, by a positioning reference device, a PRS to a UE, so that the UE measures the PRS to obtain a PRS measurement result;

sending, by the positioning reference device, a SPRS to the UE, so that the UE measures the SPRS to obtain an SPRS measurement result, wherein the PRS measurement result and the SPRS measurement result are used for positioning of the UE;

wherein different positioning reference devices send SPRSs to UEs through different frequency resources;

wherein the positioning method further comprises:

sending, by the positioning reference device, SPRS configuration information to the UE, and the SPRS configuration information includes frequency configuration information and time configuration information on which the positioning reference device sends SPRS.

10. The positioning method according to claim 9, wherein each positioning reference device sends the SPRS on a fixed frequency resource, or each positioning reference device sends the SPRS on a different frequency at a different time.

11. The positioning method according to claim 9, wherein the sending, by the positioning reference device, the SPRS to the UE comprising:

the positioning reference device continuously sending SPRS to the UE; or the positioning reference device periodically sending SPRS to the UE; or the positioning reference device sending the SPRS to the UE as needed, wherein the positioning reference device is a network side device or another UE.

12. A positioning method, comprising:

receiving, by a positioning server, a plurality of PRS measurement results and a plurality of SPRS measurement results sent by a UE;

determining, by the positioning server, a position of the UE based on the plurality of PRS measurement results and the plurality of SPRS measurement results;

wherein the receiving, by the positioning server, a plurality of PRS measurement results and a plurality of SPRS measurement results sent by the UE comprises:

receiving, by the positioning server, a report message sent by the UE, wherein the report message includes the plurality of PRS measurement results and information elements for reporting the plurality of SPRS measurement results, the information elements include the SPRS measurement result for each SPRS;

wherein the information elements further comprise: at least one of a cell identifier corresponding to each SPRS, an SPRS index, a reference time during measurement, and a quality indication of a carrier measurement value.

13. The positioning method according to claim 12, wherein each PRS measurement result comprises: at least one of RSTD and RSRP, each SPRS measurement result comprises an SPRS-CP measurement value.

14. A user equipment (UE), comprising a transceiver, a memory, a processor, and a computer program stored in the memory and executed by the processor, wherein the processor read the computer program to implement the positioning method according to claim 1.

15. A positioning reference device, comprising a transceiver, a memory, a processor, and a computer program stored in the memory and executed by the processor, wherein the processor read the computer program to implement the positioning method according to claim 9.

16. A positioning server, comprising a transceiver, a memory, a processor, and a computer program stored in the memory and executed by the processor, wherein the processor read the computer program to implement the positioning method according to claim 12.

17. The positioning method according to claim 1, wherein the SPRS is transmitted at an edge or a guard band of a carrier.

* * * * *